July 28, 1964
A. BRUDNAK, JR., ETAL
3,142,342
FLOW CONTROL COMPENSATOR
Filed Aug. 14, 1961
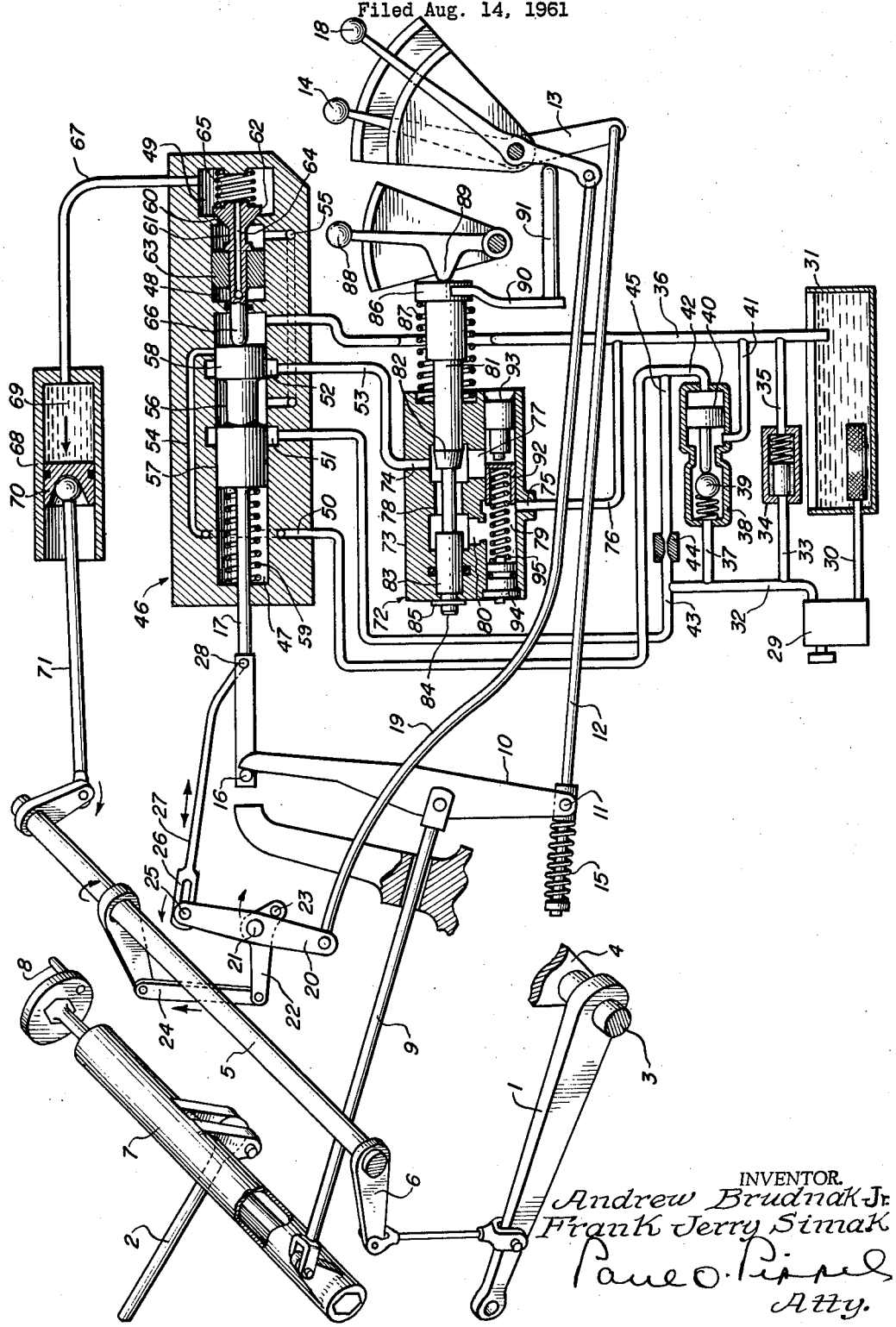
INVENTOR.
Andrew Brudnak Jr.
Frank Jerry Simak
Paul O. Pippel
Atty.

United States Patent Office 3,142,342
Patented July 28, 1964

3,142,342
FLOW CONTROL COMPENSATOR
Andrew Brudnak, Jr., Oak Lawn, and Frank Jerry Simak, Chicago, Ill., assignors to International Harvester Company, Chicago, Ill., a corporation of New Jersey
Filed Aug. 14, 1961, Ser. No. 131,265
3 Claims. (Cl. 172—9)

This invention relates generally to hydraulic systems. More particularly, it is directed to a hydraulic system for use with a tractor in controlling implements associated therewith.

Systems of this type utilize a fluid motor for raising or lowering an implement to adjust the working depth thereof. The motor is actuated by operator-responsive means to adjust the implement to a desired working depth. During operation the motor is additionally under the control of compression means variable in response to a load on the implement as it encounters varying working conditions. This results in a counteracting corrective action on the implement according to conditions effecting the the draft force thereon. With systems currently in use, the resultant corrective action may become overbalancing and cause undesirable oscillation or chattering of the implement.

Additional operator-responsive means actuates the fluid motor for raising and lowering the implement between transport and working positions. Generally, fluid is relieved from a hydraulic ram in order to move an implement from its raised or transport position to its lowered or working position. Heretofore, the rate at which implements were lowered was a variable factor dependent upon the weight of the particular implement as well as the temperature and viscosity of the hydraulic fluid.

Accordingly, it is an object of this invention to provide a hydraulic system incorporating flow control means for lowering an implement at a predetermined constant speed regardless of implement weight or the temperature and viscosity of the hydraulic fluid.

Another object of this invention is to provide a hydraulic system incorporating flow control means which will compensate for variations in pressure, temperature and viscosity of the fluid flowing therethrough in order to maintain a constant rate of fluid flow and, accordingly, a constant movement of an associated hydraulic ram.

Still another object of this invention is to provide a hydraulic system including a hydraulic ram and flow control means associated therewith such that the rate of fluid flow from said ram through a passage is maintained constant by means of a master flow controller which establishes a pressure differential and a slave flow controller responsive to said pressure differential for varying the size of said passage.

The foregoing along with additional objects and advantages will be apparent from the following description of a specific embodiment of the invention as depicted in the accompanying drawing, in which the hydraulic system is shown schematically and the ram, the valves, and the flow control means are shown in section.

Referring now to the drawing, an associated agricultural implement is connected to a tractor by means of a pair of lower hitching links, one of which is indicated by reference numeral 1 and an upper hitching link 2. Lower links 1 are pivotally secured as at 3 to the tractor frame 4. The rockshaft 5 is connected by means of suitable linkage 6 to lower links 1. Upper link 2 is pivotally secured to the torsion spring 7 which, in turn, is anchored at 8 to the tractor frame. The torsion spring may be of the type disclosed in co-pending application Serial No. 76,903, filed December 19, 1960. The member 9 is pivotally secured to torsion spring 7 and transmits forces therefrom to the draft control linkage.

Member 9 is secured to pivotal element 10 which is pivoted at 11 relative to the rod 12. Rod 12 is connected to the link 13 which is operated by the draft control 14. The spring 15, suitably anchored, serves to bias pivotal element 10. Pivotal element 10 abuts the flange 16 on the rod 17.

The position control 18 is connected through the member 19 to the lever 20. Lever 20 is pivoted at 21 to the member 22 which is, in turn, pivoted at 23. Member 22 is connected through suitable linkage 24 to rockshaft 5. These elements, shown generally here, constitute linkage means which is conventional in nature and forms no part of the present invention. It may be similar to the differential linkage disclosed in co-pending application Serial No. 56,475, filed September 16, 1960. Lever 20 has mounted thereon the pin 25 which is engaged in the groove 26 of the member 27 connected at 28 to the rod 17.

The pump 29 is connected by means of the inlet line 30 to the reservoir 31. The outlet line 32 of pump 29 communicates by means of line 33 with the conventional safety valve 34 and thence through the lines 35 and 36 with reservoir 31.

The line 37 connects the regulator valve 38 with line 32. Regulator valve 38 comprises a spring-biased ball valve 39 operable by a piston 40. One side of piston 40 communicates through the line 41 with line 36. With the other side of piston 40 communicates the line 42. Line 32 also communicates through the line 43 with the orifice 44, and thence through the line 45 with line 42.

The main control valve 46 includes chambers 47, 48, and 49. Line 42 communicates with the port 50. Line 43 communicates through the port 51 with chamber 47 intermediate the ends thereof while the port 52 adjacent one end of chamber 47 is connected to the line 53. The passage 54 leads from port 50 to chamber 47 in the area of port 52. The passage 55 leads from chamber 47 intermediate ports 51 and 52 to chamber 48. The spool valve 56 includes the land 57 movable to control flow through port 51 and the land 58 movable to control flow through port 52 and passage 54. Valve 56 is mounted on rod 17 and is biased by means of the spring 59. Line 36 communicates that portion of the chamber 47 which is opposite the position of spring 59 with reservoir 31.

The port 60 communicates chambers 48 and 49. The poppet valve 61 includes the valve head 62 and a piston 63 which is slidably engaged in chamber 48. Through valve 61 extends the bleed passage 64 so as to communicate chambers 48 and 49. Within chamber 49 is the spring 65 biasing valve head 62 so as to seat it against port 60. From valve 61 extends the pin 66 into chamber 47 for engagement by land 58 of valve 56.

The line 67 communicates chamber 49 with the hydraulic ram 68. This hydraulic ram 68 includes the cylinder 69 and its associated piston 70 connected by means of linkage 71 to rockshaft 5.

Generally indicated by reference numeral 72 is the flow control means comprising an important feature of this invention. The housing 73 has therein an inlet port 74 connected through line 53 to port 52. The outlet port 75 is connected through the line 76 and line 36 to reservoir 31. Inlet port 74 leads to the inlet passage 77 from which extend the first and second intermediate passages 78 and 79, respectively. The third intermediate passage 80 interconnects passages 78 and 79 opposite passage 77.

The piston flow controller 81 is slidably received within the passage 78 and includes a flow-metering portion 82 and a piston guide portion 83. From portion 83 the element 84 extends outwardly of housing 73 and is engaged by the snap ring 85. Snap ring 85 upon contacting housing 73 serves to limit movement of flow controller 81 in one direction. From the other end of flow controller 81 protrudes the flange 86. Between flange 86 and housing 73 is mounted the spring 87 which serves to bias flow controller 81.

The drop control 88 has thereon the knob 89 which contacts flange 86 to serve as a connection by means of which flow controller 81 may be slidably positioned within passage 78. Secured to flange 86 is the extension member 90 from which protrudes rod 91. As seen in the drawing, position control 18 is in its down or fully lowering position. At this point, position control 18 contacts rod 91. Thus it is only further movement of position control 18 in a clockwise or lowering direction that will be effective to alter the position of flow controller 81.

Within passage 79 is slidably received the freely floating piston 92. The stop member 93 is pressed into one end of passage 79 while the access member 94 is secured in the other end of passage 79. The light biasing spring 95 is mounted in passage 79 between piston 92 and access member 94.

With main control valve 46 in the neutral position as shown in the drawing, fluid pressure from pump 29 passes through lines 32 and 43, orifice 44, and lines 45 and 42 into one side of regulator valve 38. Piston 40 is moved to the left by this pressure, unseating ball valve 39. In this neutral condition the main flow of fluid from pump 29 is bypassed through lines 32 and 37, regulator valve 38, and lines 41 and 36 back to reservoir 31. Valve head 62 remains seated against port 60 under the influence of spring 65, thus maintaining fluid pressure within cylinder 69.

For moving an associated implement to its transport position, position control 18 is moved counterclockwise to its up or raising position. Through member 19, lever 20, member 27 and rod 17, the valve 56 is moved leftward against the action of spring 59. Land 58 clears passage 54 allowing fluid from regulator valve 38 to pass through line 42, port 50, and passage 54 through chamber 47 and line 36 to reservoir 31. Pressure is relieved against piston 40 allowing ball valve 39 to seat, thus preventing further bypass of fluid through regulator valve 38. At the same time, land 57 clears port 51 allowing pump pressure to pass through lines 32 and 43, port 51, chamber 47, and passage 55 to unseat poppet valve 61. Fluid pressure forces piston 63 to the left, causing the balancing fluid behind piston 63 to pass through bleed passage 64 into chamber 49. When movement of piston 63 ceases, fluid pressure acts upon valve head 62, forcing it open. Fluid then enters cylinder 69 of ram 68. Acting upon piston 70 it creates a force which rotates rockshaft 5 and moves links 1 in an upward direction to raise the associated implement. The differential linkage, conventional in nature and generally indicated by reference numerals 20 through 24, operates to return main control valve 46 to its neutral position once the implement has attained the height predetermined by the setting of position control 18. In order to drop the associated implement, position control 18 is moved clockwise toward its down or lowering position shown in the drawing. Through member 19, lever 20, and member 27, valve 56 is allowed to move to the right. Land 58 clears port 52 and forces poppet valve 61 to the right while land 57 closes port 51. Fluid from cylinder 69 freely discharges through line 67, passage 55, and line 53 to flow control means 72 and thence through lines 76 and 36 to reservoir 31. Additionally, fluid is metered through bleed passage 64 into chamber 48 causing piston 63 to move to the right relative to valve 61 and also balancing fluid pressure in chamber 49. It is to be understood, however, that spring 65 provides a small force tending to bias valve 61 to the left. The differential linkage returns main control valve 46 to its neutral position when the associated implement has been lowered to a depth corresponding to the setting of position control 18.

Passage 54 having been closed upon movement of land 58 to the right, regulator valve 38 is returned to its bypass condition.

The rate of implement drop is determined by flow control means 72. Movement of drop control 88 or, alternatively, continued movement of position control 18 in a clockwise direction beyond the down or lowering position shown in the drawing, will cause flow controller 81 to slide within passage 78. Portion 82 of flow controller 81 acts as a variable restriction, regulating communication between port 74 and passage 78 to establish a pressure differential between passage 77 and passage 78, which pressure differential is a function of the flow through port 74. This pressure differential provides unbalanced forces acting upon piston 92 in passage 79. These unbalanced forces, in conjunction with a predetermined biasing force provided by spring 95, cause piston 92 to slide within passage 79 in such a manner that communication with outlet port 75 is varied in accordance with the pressure differential. The actual rate of flow from outlet port 75 remains constant notwithstanding variable input pressures, resulting in a constant dropping rate for implements of considerably varying weights. It should further be understood that variations in the temperature or viscosity of the hydraulic fluid will not effect the rate of flow from outlet port 75 because the pressure differential established represents a percentage of the input pressure rather than an absolute difference.

The position of draft control 14 establishes a setting at which an increase or decrease in draft load can be effective for actuating the draft compensating mechanism. During controlled operation, position control 18 is set at or near its down or lowering position. When the draft load on the implement becomes excessive, a compressive force is transmitted through link 2 and, after overcoming the resistance of torsion spring 7, is further transmitted as a tension force through member 9. This operates to pivot element 10 about pivot 11 and move valve 56 leftward so as to raise the implement. Leftward movement of rod 17 allows member 27 to slide about pin 25 without disturbing any previously established settings of the position control mechanism.

When the implement has been raised sufficiently to diminish its excessive draft load, the compressive force in link 2 is reduced sufficiently so that torsion spring 7 moves member 9 to the right, whereupon main control valve 46 is returned to its neutral position. If, at this point, the draft load on the implement is less than that for which draft control 14 is set, valve 56 will be moved to the right to drop the implement. Overcompensation in this manner is eliminated by means of flow control means 72 which serves in effect to dampen the dropping rate under draft control operation, thus quickly establishing a balanced condition therefor.

The system provides for a uniform dropping rate regardless of the weight of a particular implement in use, once a desired rate is established by means of setting drop control 88 or position control 18. This insures that the working element of such implement will contact the ground quickly and at a predetermined position when position control 18 has been set to effect a dropping thereof.

Since various modifications can be made in the invention as hereinabove described and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. In an agricultural tractor-implement assembly wherein the implement is shiftable upwardly and downwardly as it encounters agricultural working conditions of varying magnitude; and wherein the tractor has hydraulic power means adapted to raise and lower the implement into and out of engagement with the ground and adapted to raise and lower the implement while in engagement with the ground so as to counteract shifting thereof resulting from the working conditions encountered, a source of fluid, pump means for supplying fluid from said source to said hydraulic power means in order to raise said implement, valve means movable in one direction to communicate said pump means with said hydraulic power means and in another direction to communicate said hydraulic power means with said source, linkage means operatively connected with said implement and responsive to downward movement of said implement for moving said valve means in said one direction and responsive to upward movement of said implement for moving said valve means in said other direction, and first manual means for engaging and disengaging said linkage means with said valve means; the improvement comprising: control means including a housing having an inlet communicating with said valve means, first and second intermediate passages each communicating with said inlet passage, a third intermediate passage connecting said first and second intermediate passages, and outlet communicating said source with said second intermediate passage between said inlet and third intermediate passages, manually operable piston means slidably mounted in said first intermediate passage for controlling communication between said inlet and first intermediate passages so as to cause a pressure differential therebetween upon the flow of fluid to said inlet passage, freely floating pressure responsive piston means slidably mounted in said second intermediate passage for controlling communication between said second intermediate passage and said outlet port in response to the aforementioned pressure differential so as to maintain a constant rate of fluid flow through said outlet port, and spring means in said second intermediate passage for biasing said pressure responsive piston means toward said inlet passage; means connecting said first manual means with said manually operable piston means for sliding said manually operable piston means upon continued movement of said first manual means after said valve means is moved in said other direction; and second manual means engageable with said manually operable piston means for sliding said manually operable piston means independently of movement of said first manual means.

2. In an agricultural tractor implement assembly wherein the implement is shiftable upwardly and downwardly as it encounters agricultural working conditions of varying magnitude; wherein the tractor has hydraulic power means adapted to raise and lower the implement into and out of engagement with the ground and adapted to raise and lower the implement while in engagement with the ground so as to counteract shifting thereof resulting from the working conditions encountered, said hydraulic power means including a fluid actuated ram, a source of fluid under pressure, and valve means movable toward one position for directing fluid from said fluid source to said ram and movable toward another position for relieving fluid from said ram; and wherein the tractor has linkage means connectable with said implement and responsive to downward movement of said implement for moving said valve means toward said one position and responsive to upward movement of said implement for moving said valve means toward said other position, said linkage means including manual actuating means for selectively moving said valve means toward either of said positions; the improvement comprising: control means operatively associated with said hydraulic power means for maintaining a constant rate of fluid flow from said ram, said control means including an inlet communicating with said valve means and an outlet communication with said fluid source, passage means communicating said inlet with said outlet, variable flow control means operatively associated with said passage means and said inlet for causing a variable pressure differential therebetween, pressure responsive means operatively associated with said outlet and responsive to said pressure differential for maintaining a constant rate of fluid flow in said outlet, means operatively connecting said manual means with said flow control means for regulating said flow control means upon continued actuation of said manual means after said selective movement of said valve means thereby toward said other position, and additional means engageable with said flow control means for regulating said flow control means independently of said manual means.

3. Fluid flow control apparatus comprising valve means movable between one position blocking fluid flow and another position allowing fluid flow; actuating means operatively connected with said valve means and movable in one direction for moving said valve means toward said one position and movable in another direction for moving said valve means toward said other position; means defining primary fluid passage means in series with said valve means and having an inlet and an outlet and secondary fluid passage means in communication with said primary fluid passage means; flow control means operatively associated with said fluid passage means for causing a pressure differential therebetween and being variable for varying said pressure differential; pressure responsive means operatively associated with said fluid passage means and responsive to said pressure differential for maintaining a constant rate of fluid flow in said outlet; means operatively connecting said actuating means with said flow control means for varying said flow control means so as to vary said pressure differential upon continued movement of said actuating means in said other direction after movement of said valve means toward said other position, thereby adjusting the constant rate at which fluid flows in said outlet; and means operatively associated with said flow control means for varying said flow control means so as to vary said pressure differential independently of said actuating means.

References Cited in the file of this patent

UNITED STATES PATENTS

| | | |
|---|---|---|
| 2,958,384 | Hull | Nov. 1, 1960 |
| 2,996,125 | Bunting | Aug. 15, 1961 |

FOREIGN PATENTS

| | | |
|---|---|---|
| 1,167,093 | France | July 7, 1958 |
| 1,201,977 | France | July 15, 1959 |
| 1,218,165 | France | Dec. 14, 1959 |
| 1,233,367 | France | May 2, 1960 |